United States Patent [19]

Meek

[11] Patent Number: 4,756,421

[45] Date of Patent: Jul. 12, 1988

[54] FOOD PACKAGE

[76] Inventor: Donald E. Meek, 2702 S. Deerfield Rd., Rolling Meadows, Ill. 60008

[21] Appl. No.: 64,526

[22] Filed: Jun. 22, 1987

[51] Int. Cl.$^4$ .............................................. B65D 1/28
[52] U.S. Cl. .................. 206/524.2; 426/127; 428/35
[58] Field of Search ............. 206/484, 524.2, 524.9, 206/631, 633; 426/126, 127; 428/35

[56] References Cited

U.S. PATENT DOCUMENTS

| 4,196,809 | 4/1980 | Tonrey | 206/484 |
| 4,355,721 | 10/1982 | Knott, II et al. | 206/524.2 |
| 4,501,797 | 2/1985 | Super et al. | 428/35 |
| 4,521,467 | 6/1985 | Berger | 206/484 |
| 4,551,365 | 11/1985 | Bonis | 428/35 |
| 4,656,068 | 4/1987 | Raines | 428/35 |
| 4,675,219 | 6/1987 | Muneki et al. | 428/35 |

FOREIGN PATENT DOCUMENTS

| 0126060 | 9/1980 | Japan | 206/484 |
| 0939204 | 10/1963 | United Kingdom | 206/633 |

Primary Examiner—Jimmy G. Foster
Attorney, Agent, or Firm—Richard W. Carpenter

[57] ABSTRACT

A two piece hermetic plastic food package that includes a flat lid and a transparent dished tray that are initially sealed to each other after filling, but which can be readily separated for opening by peeling the lid from the tray.

19 Claims, 1 Drawing Sheet

FOOD PACKAGE

BACKGROUND OF THE INVENTION

1. Field of the Invention

This invention relates to food packages and more particularly to a two piece hermetically sealed package including tray and lid portions which are readily separable from each other.

2. Description of the Prior Art

A prior art seach in the U.S. Patent and Trademark Office disclosed the following U.S. Pat. Nos.: 3,514,367; 3,912,843; 4,055,672; 4,525,414; 3,663,240; 3,932,693; 4,182,457; 4,557,780; 3,695,900; 3,955,040; 4,457,960; 4,565,742; 3,908,070; 3,988,499; 4,551,365; 4,600,616.

None of the prior art patents uncovered in the search discloses a package having tray and lid portions formed of the same plastic film components arranged in the manner of the present invention.

SUMMARY OF THE INVENTION

It is an object of the present invention to provide an improved food package, of the type used for holding and displaying luncheon meat, which comprises initially separate tray and lid portions that are bonded together after filling to form a hermetic seal, but which can be readily detached from each other to provide access to the packaged product.

Another object of the invention is the provision, in a package of the type described, of an improved lidding material that is capable of sealing to many different plastic films and that does not require that they have sealant layers.

Still another object of the invention is the provision of a lidding material that can be easily and quickly peeled away from the tray material.

Yet another object of the invention is to provide a hermetically sealed package wherein the lid and tray materials have excellent barrier properties to water vapor and oxygen, and which is suitable for vacuum packaging or packaging in a modified atmosphere controlled by gas flushing for a product, such as luncheon meat, to extend the shelf life of and provide increased protection for the product.

These and other objects of the invention will be apparent from a study of the following description and drawings.

It will be understood that, for purposes of clarity, certain elements may have been intentionally omitted from certain views where they are illustrated to better advantage in other views.

DESCRIPTION OF THE PREFERRED EMBODIMENT

Figure 1:
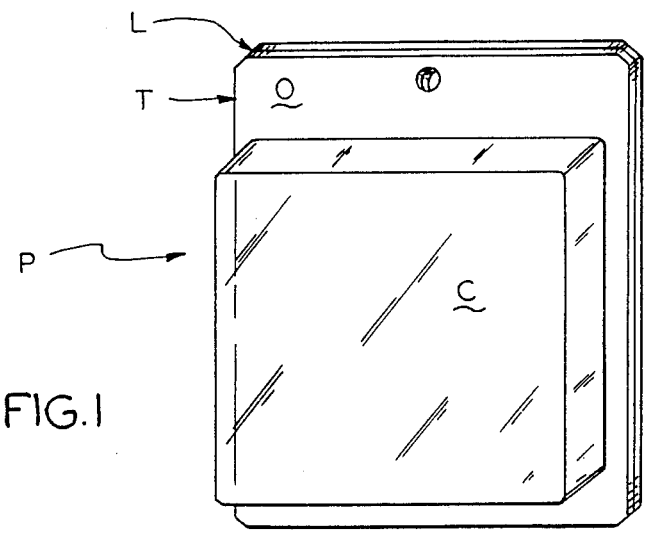
FIG. 1, is a fragmentary, inverted, isometric view of a food package embodying features of the invention.

Referring now to the drawings for a better understanding of the invention, in FIG. 1 there is illustrated a food package of the type embodying the present invention.

The package P comprises a generally flat lid L and a preformed tray T that includes a flat outer section O and a recessed center section C that provides a cavity or well W for holding a packaged product.

The tray T and lid L are formed of plastic material, the compositions of which are described in detail hereinafter, and which are adapted to be sealed together after the package has been filled with a product.

The upper surface of the flat outer section O of the tray T is disposed to underlie and be detachably secured to the adjacent, peripheral lower surface of the lid L, in such a way that it will be easy for the ultimate consumer to open the package and have access to the packaged product by peeling away the lid from the tray.

Obviously, many different types of plastic films may be used to form a package of this type, but not all films have the desired oxygen barrier characteristics that are required to extend the shelf life of food packaged therein and, at the same time, are relatively inexpensive to produce, and also provide a package that is easy for the consumer to open.

Figure 3:
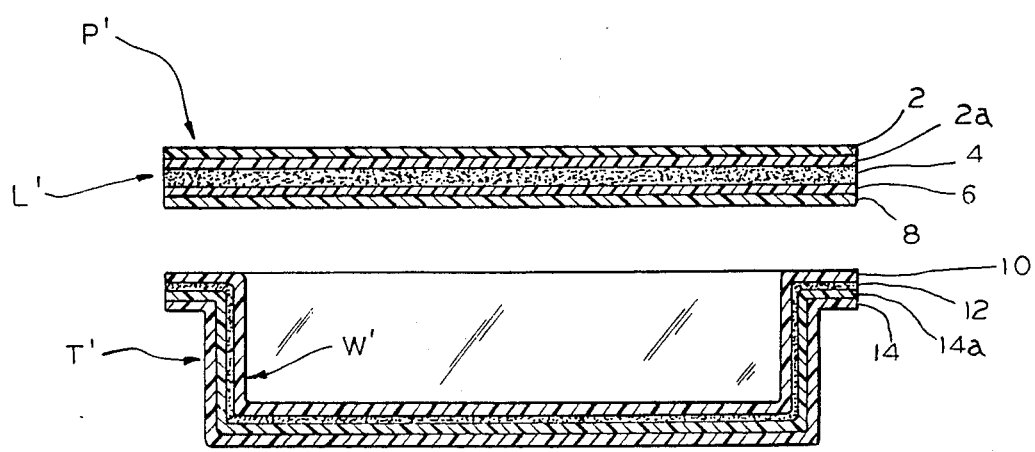
FIG. 3, is a view similar to that of FIG. 2, but showing the composition of the material of a prior art package.

Referring again to the drawings, in FIG. 3 there is illustrated a prior art package composition of the type that has been used in the past and is still being used.

The prior art package illustrated in FIG. 3 of the drawings includes a base or tray T' and a lid L'.

The lid L' of the prior art is a laminate having an outer layer 2 of polyester, with an inner barrier coating 2a such as polyvinylidene chloride, which is bonded by a thermosetting adhesive 4 to an inner layer 6/8.

It is to be understood that the terms "inner" and "outer" are used herein with reference to the center and outside, respectively, of the complete package.

The inner layer 6/8 is a co-extruded film comprising an outer sub-layer 6 of an ionomer resin, which is marketed by E.I. du Pont de Nemours and Company, Inc. under the trade name "Surlyn", or a comparable non-miscible resin, and an inner sublayer 8 of polyethylene.

The preformed tray T' of the prior art is also a laminate comprising an inner layer 10 of polyethylene which is bonded by an adhesive 12 to an outer layer 14 of polyester or polyvinyl chloride coated on the inside next to the adhesive with a barrier coating 14a such as polyvinylidene chloride.

After the prior art package is filled with the product to be packaged, the opposing polyeythelene inner layers 10 of the tray T' and 8 of the lid L' are united by heat sealing to form a bond.

As the two polyethylene layers are fused together by heat they tend to become an integral structure that is difficult to separate. When opened, the layer 10 separates from the adhesive layer 12, in the sealed areas only, and remains attached to layer 8.

On the other hand, the improved package of the present invention is designed for easy opening by the consumer, because the lid L can readily be peeled away from the tray T.

Figure 2:
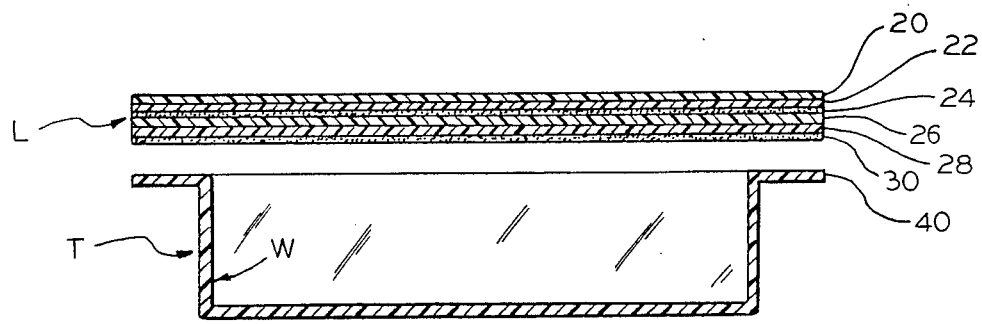
FIG. 2, is an exploded, vertical, sectional view of a package embodying the composition of the present invention.

The structure and composition of the present invention is illustrated in FIG. 2. This package also includes a flat lid L which is sealed to a dished tray T.

Lid L comprises an outer layer 20/22 which is bonded by a thermosetting adhesive 24, such as polyurethane, to an inner layer 26/28.

The outer layer 20/22 includes a film 20, made from a polyamide resin (e.g. nylon) or polyester resin, that is coated on the inner surface with an oxygen barrier coating 22, such as polyvinylidene chloride which is marketed by Dow Chemical Company under the trade name "Saran", or ethylene vinyl alcohol copolymer.

The inner layer 26/28 is a co-extruded polyolefin film consisting of an outer sub-layer 26 of polyethylene, next to the adhesive 24, and an inner sub-layer 28 of a polyethylene copolymer such as ethylene vinyl acetate.

The inner surface of inner sub-layer 28 is coated, at the time of manufacture, with a layer 30 of thermoplastic hot melt material, such as a petroleum wax-ethylene vinyl acetate copolymer composition which is marketed by Pierce and Stevens Chemical Corporation under the trade name "Proxmelt" and which serves as an adhesive or sealant material when subsequently subjected to heat and pressure by the packer.

During the development of the present invention, many different types of adhesive or sealant materials were used to join the opposed tray and lid surfaces, and the only material which proved to be successful in every case was a petroleum was-ethylene vinyl acetate copolymer composition.

Other materials either failed to provide a good hermetic seal, or they provided a seal that would not permit the lid and tray members to be peeled away from each other easily and cleanly.

The reason the petroleum wax-ethylene vinyl acetate copolymer composition is successful is because of its affinity for a variety of single component tray materials. All of the successful prior art packages have required a tray formed of at least two different materials; whereas the lid of the present invention is successful with single component tray materials.

The lid may be formed from clear transparent material or may be colored for brand identify, e.g. green for Brand X, yellow for Brand Y, or orange for Brand Z. If lid coloring is desired, the coloring material can easily be incorporated in the co-extruded inner layers 26/28.

The tray T consists of a single layer 40 of any one of several thermosetting or thermoplastic resins any of which are capable of sealing to the lidding material.

Examples of materials that do seal include acrylonitrile, which is marketed by Standard Oil Chemical Company under the trade name "Barex 210" or an acrylic multipolymer which is marketed by Cyro Industries under the trade name "XT Polymer", polyethylene terephthalate (PET), polyvinyl chloride, polycarbonate, copolymers of "PET", and polystyrene.

After the tray T has been filled, the lid L is pressed against the tray T as heat and pressure are applied to provide a peelable seal therebetween.

A significant advantage of the package of the present invention is that the complete package is less expensive to produce than conventional prior art packages, and it still provides excellent sealing equalities for a packaged product to extend its shelf life. Also, it is adapted to facilitate easy opening by the consumer, who can quickly peel the lid from the tray to open the package.

What is claimed is:

1. A plastic package for holding and displaying a perishable product, such as meat, or the like, comprising:
    (a) a tray member and a lid member, one of which s preformed by molding and has a recessed center section and a flat peripheral section;
    (b) said members presenting opposed, flat surfaces that are detachably bonded to each other by a hot melt material that provides a hermetic, peelable seal therebetween;
    (c) said lid member being a film laminate comprising:
        (i) an outer layer formed from a material selected form the group consisting of polyamide resins and polyester resins and having against its inner surface an oxygen barrier layer of material selected from the group consisting of polyvinylidene chloride and ethylene vinyl alcohol copolymer;
        (ii) an inner layer comprising a co-extruded outer sub-layer of polyethylene and an inner sub-layer of an ethylene vinyl acetate copolymer;
        (iii) said outer and inner layers being bonded together by a thermosetting adhesive;
        (iv) said inner sub-layer of said inner layer being coated with a thermoplastic hot melt material.

2. A plastic package for holding and displaying a perishable product, such as meat, or the like, comprising:
    (a) a tray member and a lid member, one of which is preformed by molding and has a recessed center section and a flat peripheral section;
    (b) said members presenting opposed, flat surfaces that are detachably bonded to each other by a hot melt material that provides a hermetic, peelable seal therebetween;
    (c) said tray member being formed from material selected from the group consisting of acrylonitrile, acrylic multipolymer, polyethylene terephthalate (PET), polyvinyl chloride, polycarbonate, copolymers of "PET", and polystyrene;
    (d) said lid member being a composite film laminate comprising:
        (i) an outer film layer formed from a material selected from the group consisting of polyamide resins and polyester resins and having against its inner surface an oxygen barrier layer of material selected from the group consisting of polyvinylidene chloride and ethylene vinyl alcohol copolymer;
        (ii) an inner layer comprising a co-extruded outer sub-layer of polyethylene and an inner sub-layer of an ethylene vinyl acetate copolymer;
        (iii) said outer and inner layers being bonded together by a thermosetting adhesive;
        (iv) said inner sub-layer of said inner layer being coated with a thermoplastic hot melt material.

3. A package according to claim 2, wherein said tray member material is acrylonitrile.

4. A package according to claim 2, wherein said tray member material is polyethylene terphalate.

5. A package according to claim 2, wherein said tray member material is polycarbonate.

6. A package according to claim 2, wherein said tray member material is a copolymer of "PET".

7. A package according to claim 2, wherein said tray member material is an acrylic multipolymer.

8. A package according to claim 2, wherein said tray member material is polystyrene.

9. A package according to claim 2, wherein said lid member outer layer material is nylon.

10. A package according to claim 2, wherein said lid member outer layer material is polyester.

11. A package according to claim 2, wherein said oxygen barrier material is polyvinylidene chloride.

12. A package according to claim 11, wherein said polyvinylidene chloride is in the form of a coating.

13. A package according to claim 11, wherein said polyvinylidene chloride is in the form of a layer of film coated with a thermosetting adhesive.

14. A package according to claim 2, wherein said oxygen barrier material is ethylene vinyl alcohol copolymer.

15. A package according to claim 14, wherein said ethylene vinyl alcohol is in the form of a coating.

16. A package according to claim 14, wherein said ethylene vinyl alcohol is in the form of a layer of film coated with a thermosetting adhesive.

17. A package according to claim 2, wherein said thermoplastic hot melt material is a petroleum wax-ethylene vinyl acetate copolymer composition.

18. A package according to claim 2, wherein said tray member is preformed and has a recessed center section and a flat peripheral section.

19. A package according to claim 2, wherein said lid member is preformed and has a recessed center section and a flat peripheral section.

* * * * *

UNITED STATES PATENT AND TRADEMARK OFFICE
CERTIFICATE OF CORRECTION

PATENT NO. : 4,756,421
DATED : Jul. 12, 1988
INVENTOR(S) : Donald E. Meek

It is certified that error appears in the above—identified patent and that said Letters Patent is hereby corrected as shown below:

On the title page Insert

-- [73] Assignee: Jefferson Smurfit Corporation
Alton, Illinois --.

Signed and Sealed this

Twenty-first Day of November, 1989

Attest:

JEFFREY M. SAMUELS

Attesting Officer   Acting Commissioner of Patents and Trademarks